June 9, 1959  M. B. LUCKER ET AL  2,889,894
SELF-ADJUSTING DISC BRAKE AND ANNULAR PISTON-TYPE
OPERATING MEANS THEREFOR
Filed May 15, 1956  7 Sheets-Sheet 1

INVENTORS.
M. B. Lucker
R. R. Zindler
BY
Robert Cobb
Attorneys

June 9, 1959
M. B. LUCKER ET AL
2,889,894
SELF-ADJUSTING DISC BRAKE AND ANNULAR PISTON-TYPE
OPERATING MEANS THEREFOR
Filed May 15, 1956
7 Sheets-Sheet 3
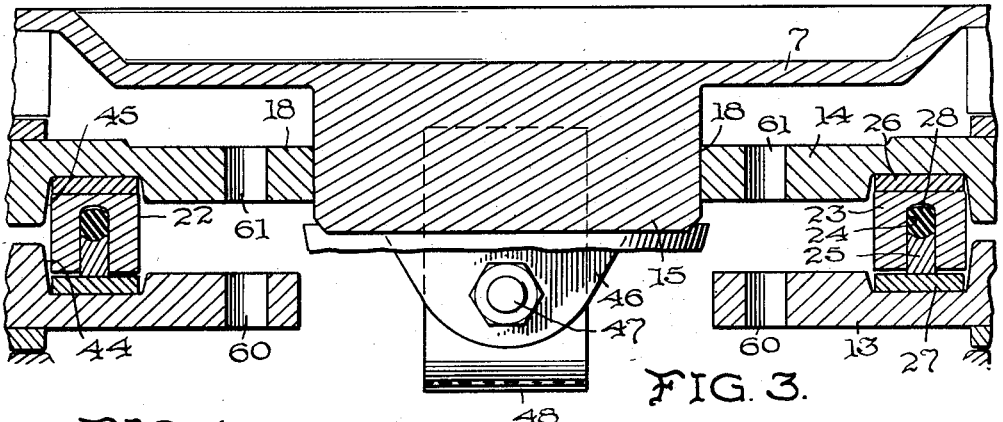
FIG. 3.
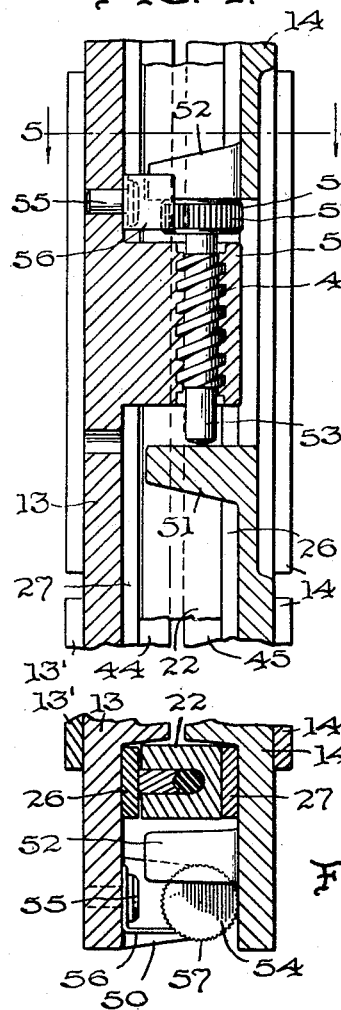
FIG. 4.
FIG. 5.
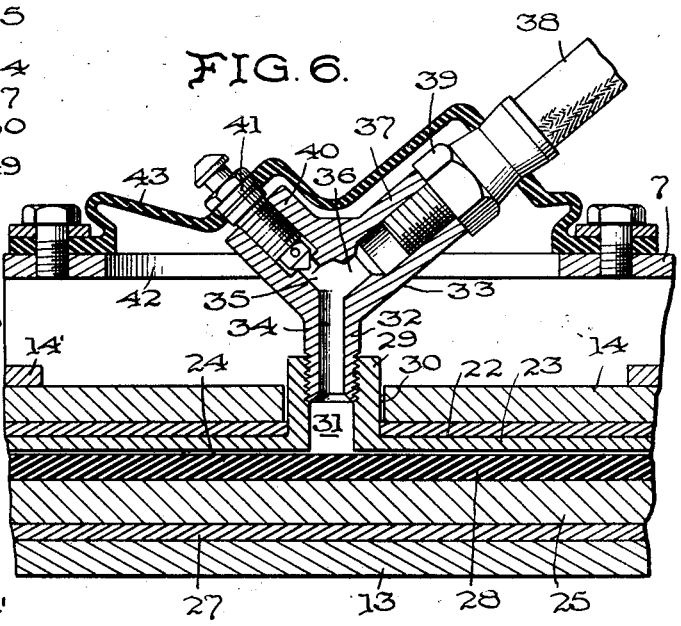
FIG. 6.
INVENTORS.
M. B. Lucker
C. R. Zindler
BY
Cobb & Cobb
Attorneys.

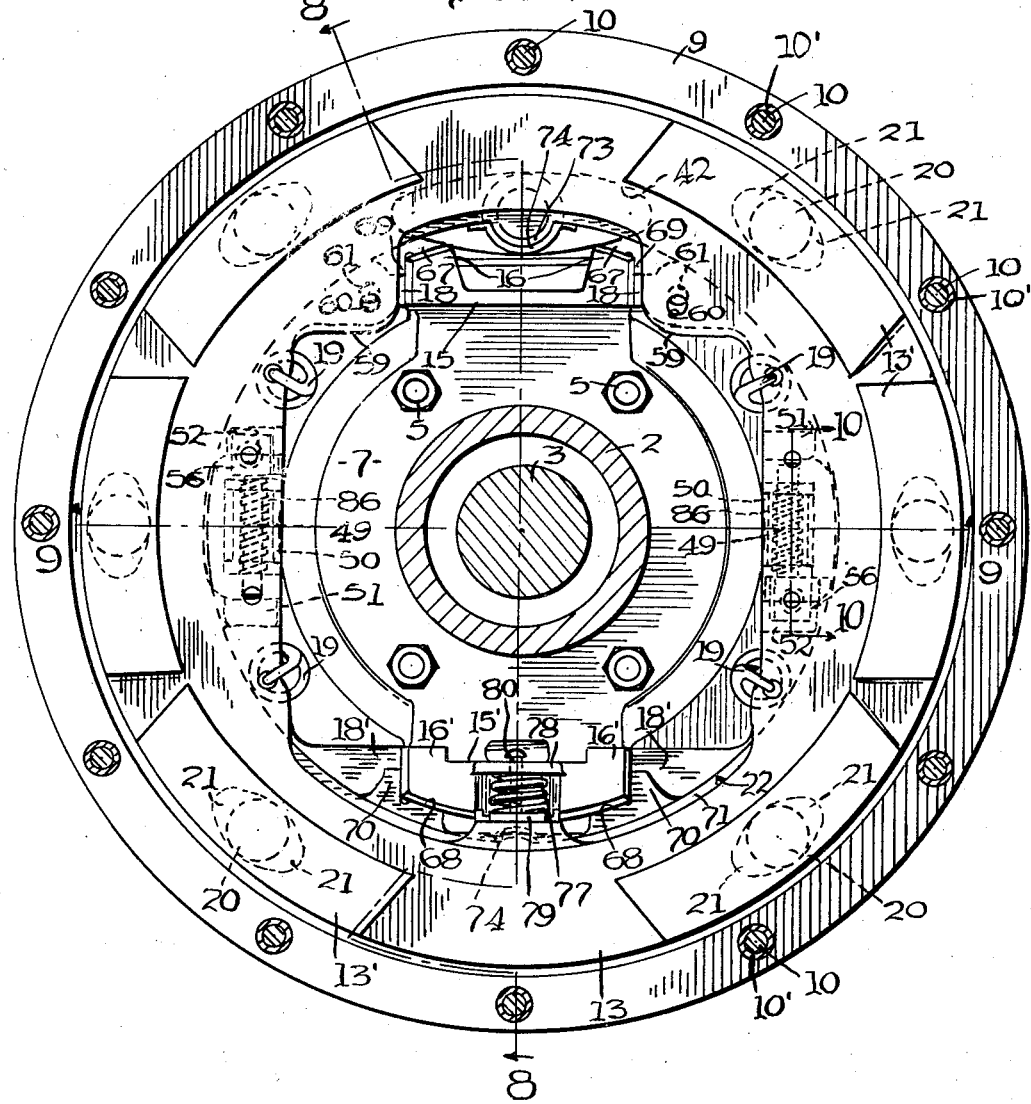

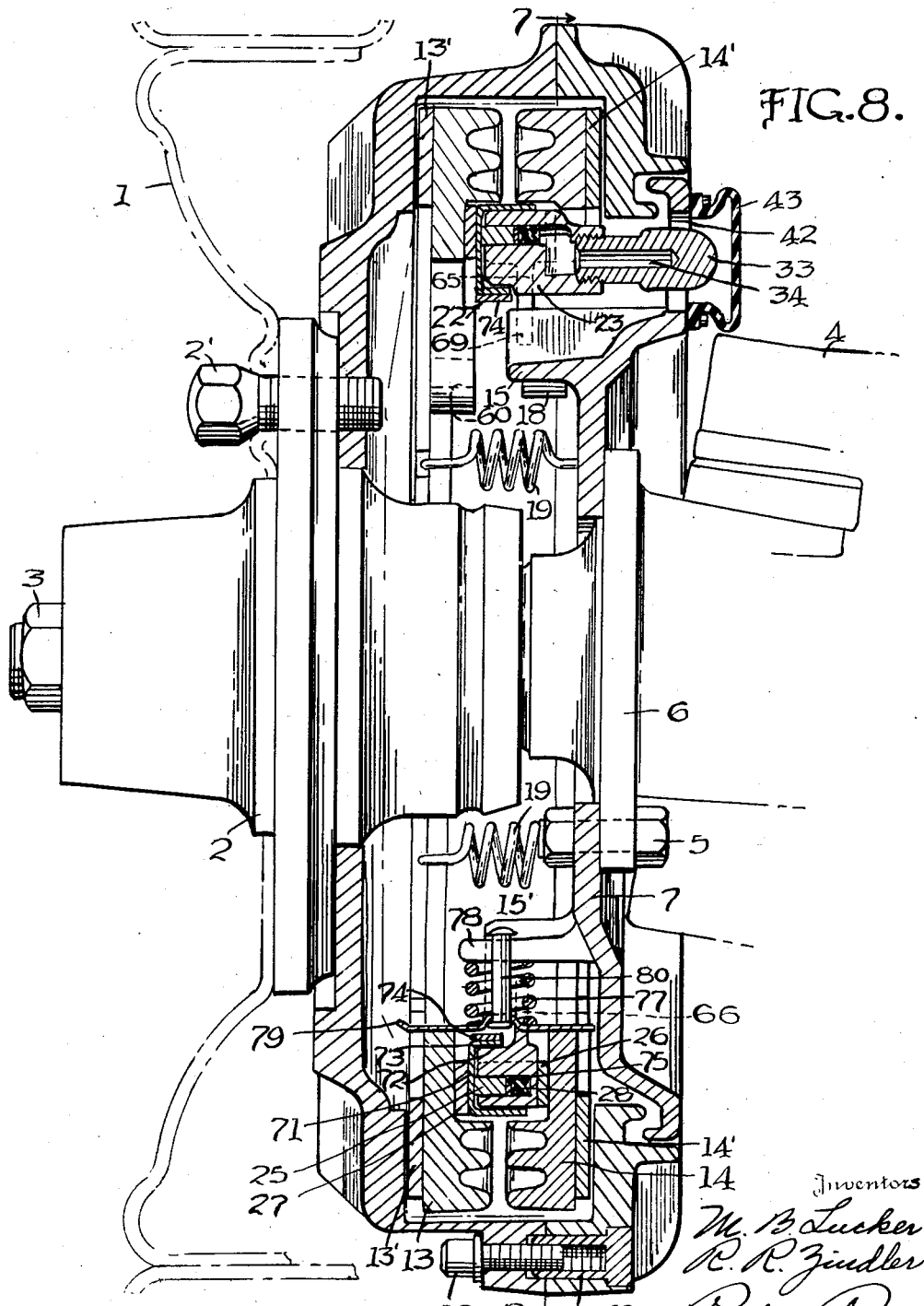

June 9, 1959  M. B. LUCKER ET AL  2,889,894
SELF-ADJUSTING DISC BRAKE AND ANNULAR PISTON-TYPE
OPERATING MEANS THEREFOR
Filed May 15, 1956  7 Sheets-Sheet 6
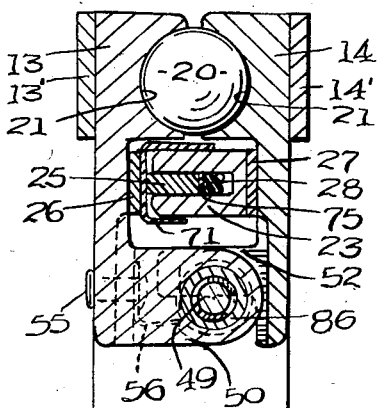
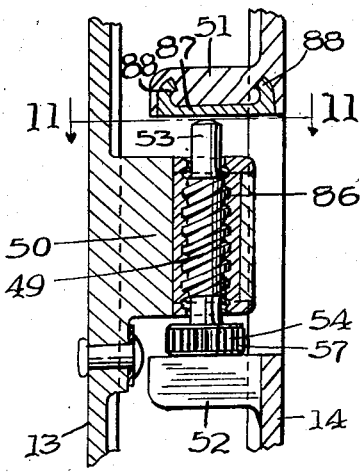
FIG.10.
FIG.9.
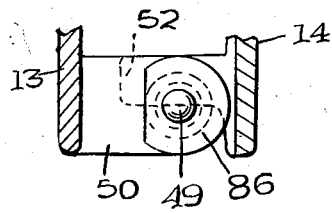
FIG.11.
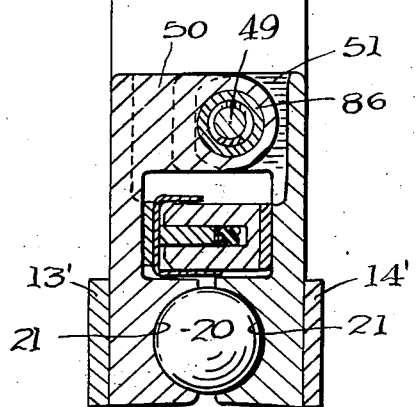
Inventors.
M. B. Lucker
R. R. Zindler
By Robert Cobb
Attorneys

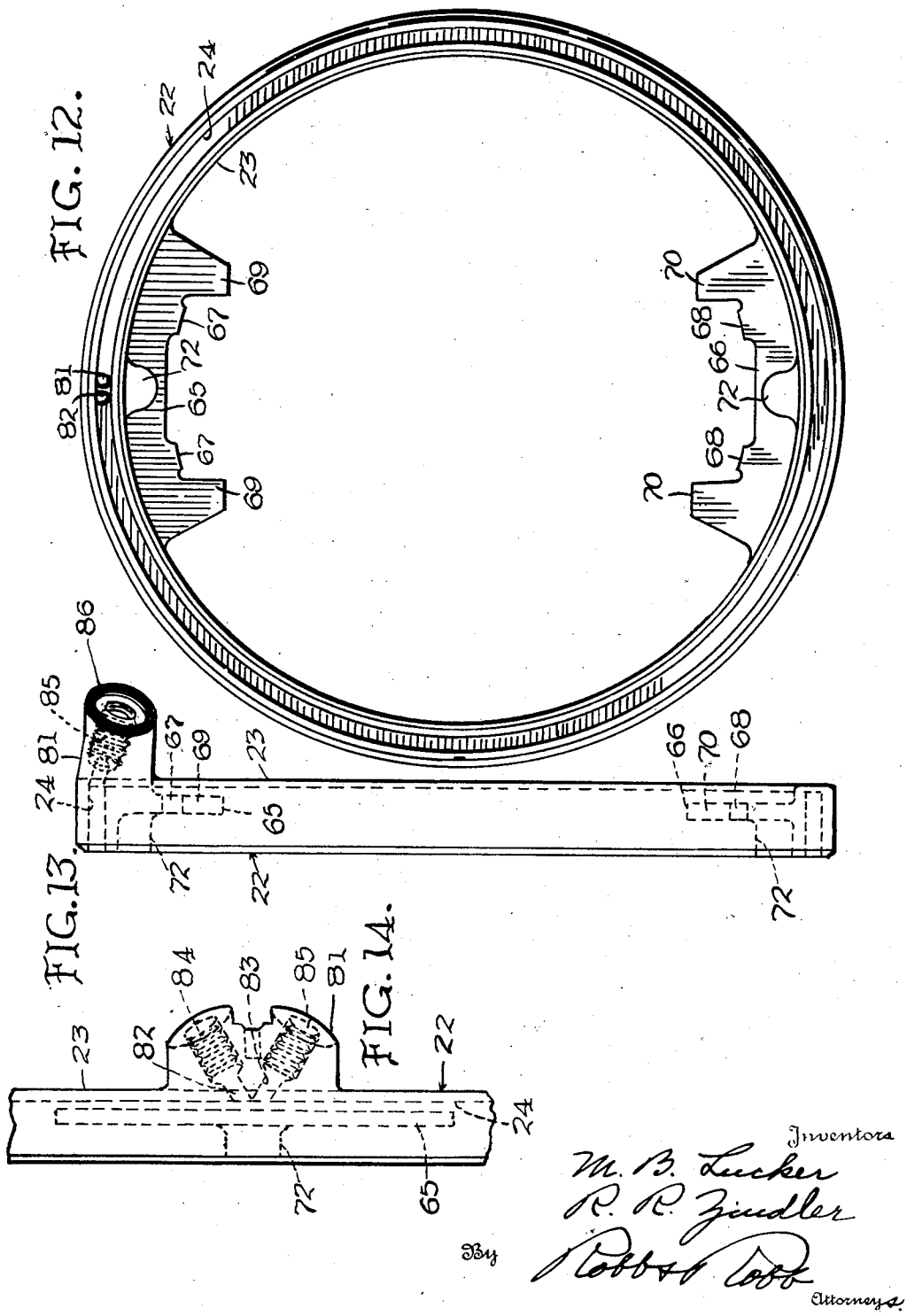

United States Patent Office 2,889,894
Patented June 9, 1959

2,889,894
SELF-ADJUSTING DISC BRAKE AND ANNULAR PISTON-TYPE OPERATING MEANS THEREFOR

Millard B. Lucker and Roger R. Zindler, St. Joseph, Mich., assignors, by mesne assignments, to Lambert Brake Corporation, St. Joseph, Mich., a corporation of Michigan Application May 15, 1956, Serial No. 585,058
9 Claims. (Cl. 188—72)

This application is a continuation-in-part of our co-pending application Serial No. 422,055, filed April 9, 1954, now abandoned.

The present invention relates to disc brakes, and more particularly to a disc brake having novel means for eliminating certain noises inherent in such a disc brake construction.

Certain types of well-known disc brakes include a pair of relatively rotatively and axially shiftable brake discs in the form of annular plates or in the form of partly annular plates, these discs being adapted to frictionally engage a rotary member to be braked upon initial actuation thereof, and these brakes further include camming means for positively forcing the discs into frictional contact with the rotary member responsive to drag torque imparted to the discs by the rotary member upon initial engagement of the brake.

An object of the present invention is to provide such a disc brake for use on motor vehicles and the like, including self-adjuster means operative to maintain a predetermined release clearance for the brake, this adjuster means being engaged by at least one brake disc during braking of forward movement of the vehicle to effect automatic adjustment of the brake, and the adjuster means being engaged by at least one disc to absorb the torque transmitted to the latter from the rotary member being braked during brake application to brake reverse movements of the vehicle. Thus, the adjuster means acts as an adjuster for the brake as well as an anchor for at least one of the brake discs during brake application, and certain objectionable noises heretofore encountered in disc brakes of the same general type are effectively eliminated.

A further object is to provide a self-energizing disc brake including a pair of brake discs adapted to engage a pair of opposed friction faces of a rotary member to be braked, a stationary support on which said discs are shiftably mounted for movements into and out of engagement with the rotary member, automatic adjuster means operative upon said discs during brake application to automatically compensate for wear of the brake friction lining, means for anchoring at least one disc on the stationary support against rotation with the rotary member in one direction, this anchoring means comprising the automatic adjuster means, and the latter disc being free to rotate slightly relative to the other disc upon rotation of the rotary member in the other direction to effect self-adjustment of the brake and to allow self-energization of the brake by camming means operative upon relative rotation of the discs.

Another object is to provide a self-energizing, self-adjusting disc brake including a pair of relatively rotatable and axially shiftable annular brake discs disposed between opposed friction faces within a rotary brake housing, these discs being shiftably mounted upon a stationary support and having an annular, hydraulic actuator cylinder disposed therebetween for effecting axial separation of the discs to initially engage the brake, means on the support for anchoring one disc against rotative movements, and the other disc being supported on the last-mentioned disc by means of a plurality of brake return or release springs and a plurality of camming balls disposed between the discs and seated in inclined seats in the discs for effecting axial separation of the discs responsive to relative rotation thereof, the discs having cooperative self-adjuster means including a pair of fixed abutments on one disc and an adjuster member shiftably mounted on the other disc and disposed between said abutments, the shiftable adjuster member being adapted to be engaged by one of the abutments so as to be shifted in its mounting upon rotation in one direction of one disc relative to the other disc, but being adapted to be engaged by the other abutment to anchor the discs against relative rotation in the other direction.

A still further object is to provide such a double-disc brake which includes an annular actuator cylinder disposed between the discs and freely mounted in a channel formed between the discs by flanges on the opposed faces of the discs, which flanges project towards one another, and the actuator cylinder being separated from the discs by means of rings of insulating material having a high content of asbestos or other suitable material, said rings being interposed between the actuator cylinder and the respective discs to prevent the transmission of heat from the discs to the fluid in the actuator cylinder.

By virtue of the accomplishment of the foregoing objectives in the production of a "Double-Disc" brake, objectionable clunking noises occasioned by the shifting to anchorage of one disc or the other, depending upon the direction of the rotation of the brake housing, as have heretofore been prevalent in brakes of this kind, are prevented, since one disc is continuously anchored against rotation, while the other disc is free for energizing movements in one direction, but is normally anchored against rotation in the other direction upon brake application.

Another objectionable noise is sometimes caused by manufacturing tolerances during the production of disc brakes as aforesaid, this latter noise resulting from vibration or rattling of the disc assembly on the supporting lugs therefor. Accordingly, still another object is to provide a novel anti-rattle means for eliminating such rattling of the discs.

And yet another object is to provide a disc brake as aforesaid, including an annular fluid pressure operated actuator device, this annular actuator including means for effectively eliminating any tendency of the actuator parts to bind during operation, thus assuring positive and uniform brake operation.

An additional object is to provide an annular actuator as aforesaid which is anchored against rotative movements, thus eliminating an additional source of noise.

And still another object is to provide a self-adjusting disc brake of the aforementioned type, wherein the adjuster screw is supported in a hardened complementally threaded sleeve which is cast into place during casting of the discs, thus substantially facilitating the manufacture of the discs.

Other objects and advantages of the invention will be hereinafter described or will become apparent to those skilled in the art, and the novel features thereof defined in the appended claims.

In the drawings:
Fig. 1 is a view in side elevation of one form of brake embodying certain features of the present invention, with the outboard side of the brake housing removed to disclose the interior construction, this view representing a section as taken on the line 1—1 of Fig. 2;

Fig. 3 is an enlarged view in section, as taken on the line 3—3 of Fig. 1, with a portion of the wheel-mounting hub broken away;

Fig. 4 is an enlarged fragmentary view in section, as taken on the line 4—4 of Fig. 1;

Fig. 5 is a view in section, as taken on the line 5—5 of Fig. 4;

Fig. 6 is a fragmentary view in section, as taken on the line 6—6 of Fig. 2;

Fig. 7 is a view similar to Fig. 1, showing a modified brake construction, and being a sectional view as taken on the line 7—7 of Fig. 8;

Fig. 8 is a slightly enlarged view in section, as taken on the line 8—8 of Fig. 7;

Fig. 9 is a slightly enlarged detail view in section, as taken on the line 9—9 of Fig. 7, particularly showing the modified inner disc assembly;

Fig. 10 is an enlarged fragmentary view, as taken on the line 10—10 of Fig. 7;

Fig. 11 is a fragmentary view partially in section and partially in elevation, as taken on the line 11—11 of Fig. 10;

Fig. 12 is a detail view in side elevation of the annular actuator device of Fig. 7;

Fig. 13 is a view in edge elevation of the detail of Fig. 12; and

Fig. 14 is a fragmentary view in edge elevation of the detail of Fig. 12, particularly showing the modified connector means which is adapted to be connected with a fluid conduit and with a bleeder valve for the annular actuator.

Like reference characters in the several figures of the drawings and in the following description designate corresponding parts.

Figure 1:
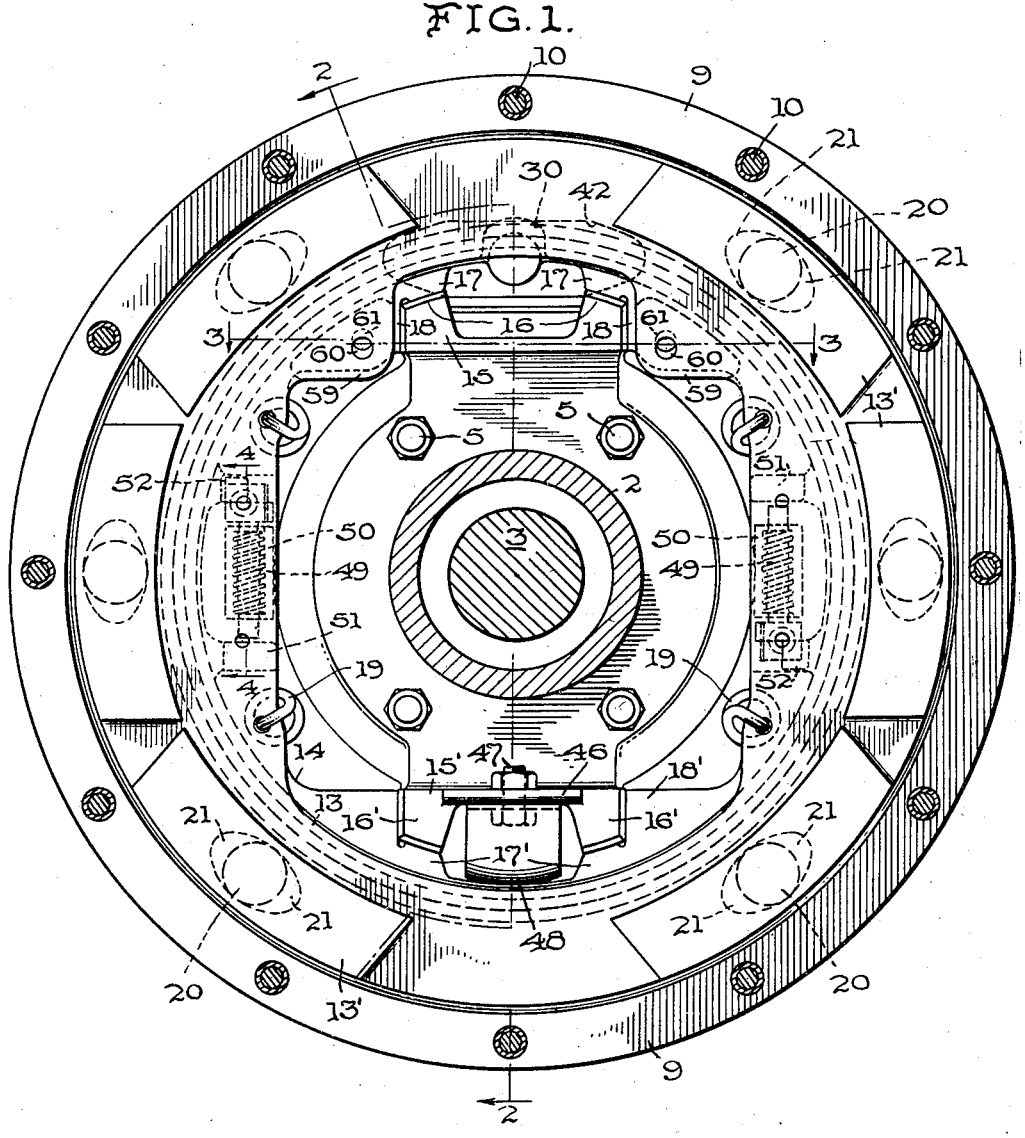

The brake illustrated in the drawings represents a left front brake for a motor vehicle, adapted to be associated with a vehicle wheel 1 which is mounted on a wheel-mounting hub 2, as by means of a suitable number of screw fasteners 2', the hub 2 being journalled on a spindle 3 of a front wheel-supporting assembly 4. Adapted to be connected to the wheel-supporting structure 4, as by means of a plurality of fasteners 5 extending through a flange 6, is a stationary backing plate or adapter 7.

Secured to the wheel-mounting hub 2 by the screws 2' is a hollow, two-part rotatable brake housing having an outboard section 8 and an inboard section 9 secured together as by means of a suitable number of screws 10 which threadedly engage in a like number of nuts 10' which are recessed in the inboard section 9 of the housing. Interiorly thereof, the housing sections 8 and 9 are respectively provided with opposed, radially extended friction surfaces 11 and 12 which are adapted to be engaged by a pair of brake discs 13 and 14 which are disposed within the housing and constitute an inner double-disc assembly.

The disc 13 constitutes a relatively rotatable disc or plate, and the disc 14 constitutes a relatively fixed disc or plate which is mounted upon the backing plate 7 for axial shifting movements, but which is fixed against rotative movements. The backing plate 7 is provided with a generally axially extended supporting lug 15 which is preferably formed with a pair of arcuate bearing portions 16, 16, and the disc 14 is provided on its inner periphery with a pair of bearing projections 17, 17 slidably supported upon the projections 16, 16. Adjacent to each of the bearing projections 17 on the disc 14, this disc is provided with a pair of opposed anchor lugs 18, 18 which engage with the opposite sides of the supporting lug 15 on the backing plate 7 to prevent rotative movements of the disc 14, while allowing this disc to shift axially on the supporting lug 15. In diametrically opposed relation to the supporting lug 15, the backing plate 7 is provided with a second supporting lug 15', having bearing portions 16', 16'. The disc 14 is also provided with a pair of bearing projections 17', 17' and a pair of anchor lugs 18', 18' for supporting and anchoring engagement with the supporting lug 15'.

Thus, the inboard disc 14 is supported upon the backing plate 7, while the outboard disc 13 is preferably carried by and supported upon the inboard disc 14 by means of a suitable number of return or release springs 19, and a plurality of hardened camming balls 20, disposed in opposed oppositely inclined ramped seats 21 formed in the opposed inner faces of the respective discs 13 and 14 and which maintain the disc 13 in spaced relation to the disc 14 and concentrically disposed relative to the brake assembly, the disc 13 preferably being free of any contact with the supporting lugs 15 and 15'. The balls 20 serve to cam the discs 13 and 14 axially apart responsive to drag torque imparted to the relatively rotatable outboard disc 13 upon initial engagement of the discs 13 and 14 with the rotatable housing.

The housing sections 8 and 9 and the discs 13 and 14 constitute a plurality of brake members which are disposed in side-by-side relationship, and means are provided for effecting initial actuation of the discs 13 and 14 to shift these discs into frictional engagement with the friction surfaces 11 and 12 of the rotatable housing for effecting initial brake engagement. In the embodiment herein specifically shown in Figs. 1 through 6 and now to be described, this actuator means comprises a hydraulic actuator assembly 22 which is of annular form and which is disposed between the discs 13 and 14 of the inner double-disc assembly. This actuator cylinder 22 includes an annular cylinder body 23 of generally rectangular cross section which is provided in one side thereof with an annular piston chamber 24 in which is reciprocably disposed an annular piston 25. Interposed between the cylinder body 23 and one of the discs, and between the piston 25 and the other of the discs 13 and 14, is a pair of insulating rings 26 and 27, whereby during brake applications, the transmission of heat from the discs 13 and 14 to the actuator cylinder 22 is prevented, these insulating rings 26 and 27 being preferably fabricated of a material having a high content of asbestos or other insulating substance. A hydraulic fluid is utilized to shift the actuator piston 25 outwardly with respect to the body 23, and therefore, a seal 28 preferably in the form of an annular O-ring is utilized to seal the hydraulic actuator cylinder 22 against leakage.

For admitting fluid under pressure into the actuator cylinder 22, the cylinder body 23 is provided with a hollow neck 29 which projects rearwardly from the rear wall thereof through an opening or depression 30 in the inboard disc 14. This neck 29 is provided with a passage 31 communicating with the piston chamber 24, and interiorly of the neck 29, it is threaded for engagement with complemental threads on a stem 32 of a fitting generally designated 33, this fitting having an inlet-outlet passage 34 communicating with the passage 31 in the neck 29 and also having a pair of passages 35 and 36 communicating with the passage 34. The passage 36 extends through an arm 37 of the fitting 33, and this arm 37 is adapted to receive an end of a fluid conduit 38 which is coupled to the arm 37 in any suitable manner as at 39, whereby fluid under pressure may be supplied to the actuator cylinder 22. The passage 35 extends through an arm 40 of the fitting 33 and is adapted to receive a conventional bleeder valve assembly generally designated 41. The fitting 33 extends through an opening 42 in the backing or adapter plate 7, and a resilient dust seal 43 of rubber or other suitable material is secured to the backing plate 7 and is sealingly engaged about the bleeder valve 41 and the fluid conduit 38, so as to preclude the entry of foreign matter into the brake housing.

The annular actuator cylinder 22 is substantially freely mounted and floats between the discs 13 and 14, and the discs 13 and 14 are each provided with a generally axially extended flange 44 and 45, respectively, forming a channel between the discs in which the annular actuator 22 is disposed, with the flanges 44 and 45 supporting and restraining the actuator cylinder 22 against displacement from its concentric relation to the brake assembly as a whole. The insulating rings 26 and 27 are also freely mounted between the actuator cylinder and the respective discs. It should be understood that when the present brake is installed on a motor vehicle, the fluid conduit 38 and the piston chamber 24 are filled with brake fluid which is maintained under residual pressure, as produced by a conventional master cylinder (not shown) with which such vehicles are usually equipped, this residual pressure being incapable of causing axial separation of the discs, but being sufficient to maintain a tight relationship between the discs 13 and 14 and the insulating rings 26 and 27 due to the expansive force of the piston 25 and cylinder body 23 caused by this residual pressure.

Figure 2:
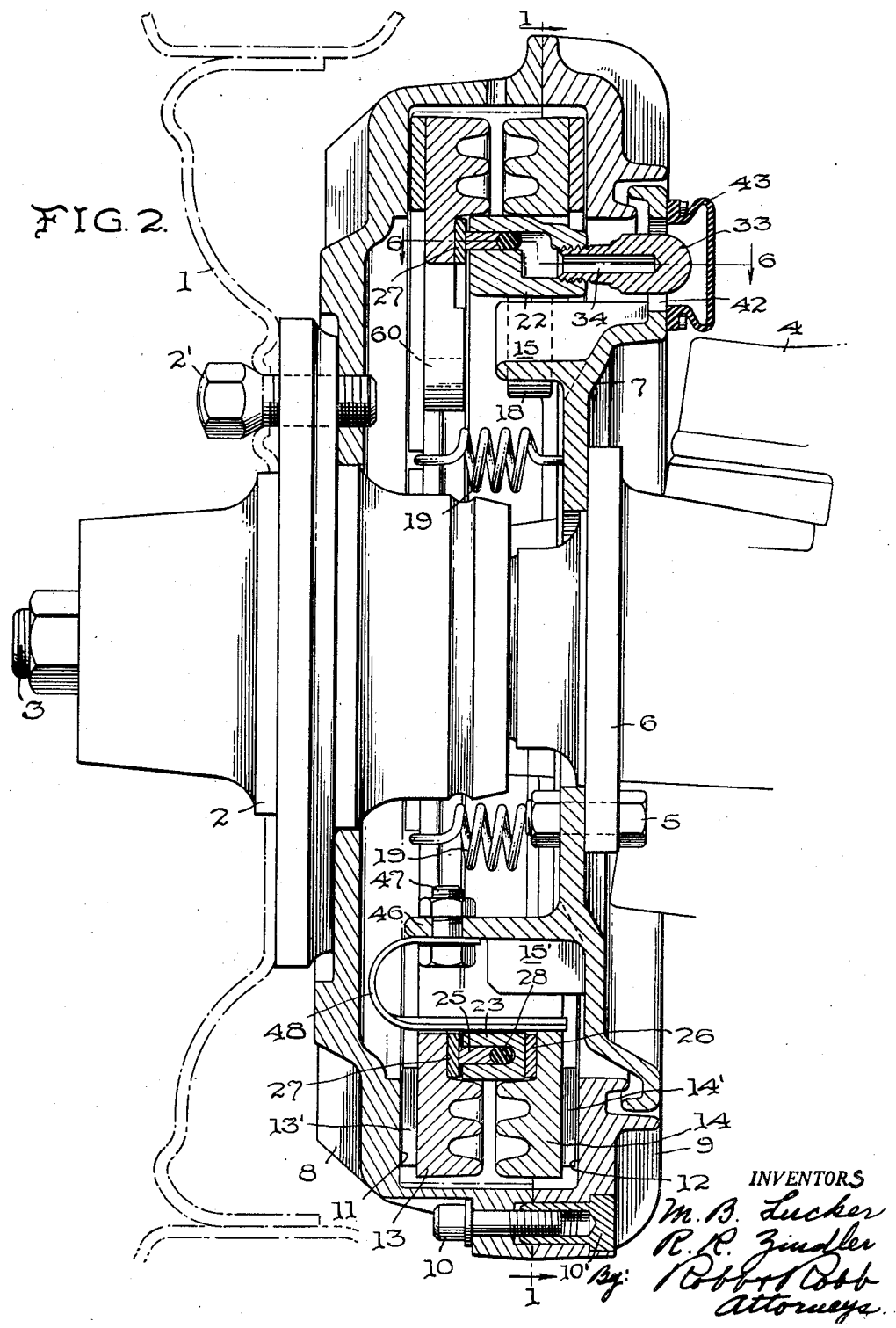
Fig. 2 is a slightly enlarged view in section, as taken on the line 2—2 of Fig. 1, with certain of the parts shown in elevation.

However, while this residual pressure maintains a vibration-free relationship between the annular actuator 22 and the discs 13 and 14, and the actuator cylinder 22 is carried by the two discs, the inner double-disc assembly as a whole would ordinarily be capable of slight vibration due to road shock during movement of the motor vehicle, due to manufacturing tolerances between the disc 14 and the lugs 15, 15'. In order to avoid such vibration, with resultant elimination of objectionable noise or rattle, means is provided for biasing the inner double-disc assembly into snug contact with the supporting lug 15 on the backing plate 7. For this purpose, the supporting lug 15' on the backing plate 7 is provided with an axially extended lip 46 to which is secured by means of a screw fastener 47 or the like a generally U-shaped leaf spring 48 having one side or arm thereof connected by the fastener 47 to the lip 46, while the other side or arm extends across the inner double-disc assembly and bears upon the inner margin of the inboard disc 14, as best seen in Fig. 2, to urge the entire double disc assembly downwardly, whereby the supporting lugs 17 on the inner periphery of the inboard disc 14 are maintained in close contact with the supporting projections 16 on the lug 15, and vibratory movements of the disc assembly are effectively precluded.

When the brake is to be applied, fluid under pressure will be transmitted through the conduit 38 to the actuator cylinder 22 by any suitable means, such as a conventional foot-pedal-operated master cylinder (not shown), and the actuator cylinder 22 will expand to shift the discs axially apart and into initial engagement with the friction surfaces 11 and 12 in the housing. Upon such initial frictional engagement, the outboard disc 13 will "clock" rotatively along with the housing to bring into play the camming balls 20 which will positively force the discs into harder frictional engagement with the friction surfaces of the housing. The discs 13 and 14, as is usual, are preferably provided with friction lining material segments 13' and 14', respectively, and after repeated braking operations, this friction lining material will begin to wear down. Therefore, the brake is preferably provided with means for adjusting the discs 13 and 14 to maintain a minimum predetermined release clearance between the discs and the friction surfaces of the housing, so that brake actuating movements of the discs will be maintained at a minimum.

This adjuster means, as seen in the brake of Figs. 1 through 6, is preferably in the form of combined self-adjuster and torque-absorption means which includes a pair of adjuster screws 49 disposed at diametrically opposite sides of the disc assembly and respectively carried by a pair of screw-supporting lugs 50 on the inner face of the outboard disc 13, these lugs 50 each having a longitudinally extended, screw threaded opening therethrough in which the screws 49 are threadedly mounted. The inboard disc 14 is provided with a pair of opposed abutments 51 and 52 which project outwardly from the outboard face of the inboard disc 14 into overlying relation with the opposite ends of the screw 49 of each adjuster. Each screw 49 is provided with a rounded lead end 53 which is engageable with the abutment 51 upon rotation of the outboard disc 13 relative to the inboard disc 14 in a direction to apply the brake during forward motion of the vehicle on which the brake is mounted, and upon release of the brake, the other end of each adjuster screw 49 will be engaged by the abutment 52, as the outboard disc 13 commences to rotate in the opposite direction, responsive to the pull of the brake return or release springs 19. As the friction linings 13' and 14' wear down, the outboard disc 13 will rotate progressively further relative to the inboard disc 14, and as the end 53 of each screw 49 engages its respective abutment 51, the screws 49 will automatically be caused to rotate and back out of the lugs 50 so as to permit such movement of the disc 13.

Means is provided, however, to prevent the adjuster screws from shifting axially in the other direction by effectively precluding rotation of the screws 49 in the opposite direction. In this connection, each screw 49 is preferably provided with an enlarged head 54 which is engageable with the abutment 52 on the inboard disc 14. Frictional engagement between the lugs 52 and the heads 54 of the screws 49, to a large extent, will prevent abutting contact of the heads 54 with the abutments 52 from causing the screws to rotate in the openings in the screw supports 50, and additionally, the outboard disc 13 has secured thereto adjacent to each screw head 54, as by means of a suitable fastener element 55, a spring dog or pawl 56 which engages in teeth or notches 57 disposed about the outer periphery of the screw heads 54, these spring pawls positively locking the screws 49 against rotation in one direction, and the screws 49 thereby constituting one-way shiftable members. Thus, during forward movement of the vehicle, the brake will be allowed to self-energize responsive to rotation of the disc 13 relative to the disc 14, but return movements of the disc 13 will be limited to only that slight amount which is required for sufficient brake release clearance. As is best seen in Fig. 4, this release clearance is provided by reason of the fact that the overall length of the respective adjuster screws 49 is slightly less than the distance between the abutments 51 and 52, as represented by the slight gap between the lead end 53 of the screw of this figure and the abutment 51.

The just described adjuster mechanism effects automatic adjustment of the brake by precluding return movements of the outboard disc 13 after the outboard disc 13 has been caused to shift rotatively to effect a camming action of the balls 20 as they ride up the opposed ramped seats 21, 21, and the balls 20 maintain the discs in their adjusted positions, because of the fact that the disc 13 is prevented from shifting back to its original position and the balls are prevented from riding back down to the deepest parts of the ramped seats 21, 21. By the same token, when the rotary housing is rotating in a clockwise direction as viewed in Fig. 1, as would occur during reverse movements of the motor vehicle, the outboard disc 13 cannot clock or rotate along with the housing responsive to drag torque of the housing, because the adjuster screws 49, which are one-way shiftable members, have their heads 54 in abutting engagement with the abutments 52 on the inboard disc 14. Accordingly, the discs are capable of shifting only axially apart into engagement with the rotary housing, responsive to the actuating force of the hydraulic actuator cylinder 22, and the braking torque imparted to the outboard disc 13 is absorbed by the screw adjusters and prevents clocking of the disc 13, thereby anchoring the same. Accordingly, there is no self-energization of the brake during reverse movements of the vehicle. However, self-energization of the brake is not necessary during reverse movements of the vehicle; nor is self-adjustment necessary at such time, since the brake is used only infrequently and at low vehicle speed for reverse braking, as compared with the frequency of usage during forward movements of the vehicle and the speeds travelled in a forward direction.

Certain advantages are attained by the present brake by virtue of the fact that the inboard disc 14 is fixed against rotative movements and is, so to speak, a non-energizing disc. Among these advantages is the obviation of any undesirable "click" or "clunk" which sometimes occurs when other known types of "Double-Disc" brakes utilize the inboard disc for self-energization during reverse braking, since if the inboard disc 14 were left free for relative rotative movement along with the housing during reverse braking, the outboard disc 13 would necessarily have to be anchored against rotation. Accordingly, either during reverse braking or forward braking, one disc or the other would have to shift to engage with a fixed anchor, responsive to the drag torque of the housing, and upon engagement of the disc with the fixed anchor, a "clunk" or "click" is usually produced, which is objectionable in the case of passenger vehicles. However, it will be observed that the present brake has the inboard disc 14 always anchored against clocking movements so that no objectionable noise is produced by the disc 14 shifting to an anchor during forward braking, and the outboard disc 13 is anchored on the abutment 52 by the heads 54 of the adjuster screws 49, whereby the outboard disc 13 is not capable of rotative movements in one direction, and therefore the brake does not produce any objectionable noise due to the outboard disc 13 shifting to an anchor during reverse braking.

Referring to Figs. 7 through 14, there is shown a modified brake assembly bearing similar reference characters to those applied to the structure of Figs. 1 through 6, where applicable.

In this modified construction, the annular actuator 22 is so constructed that it is anchored on the disc supporting lugs 15 and 15' on the backing plate 7 and is precluded from moving rotatively with respect to the backing plate 7, thereby eliminating the possibility of the annular actuator 22 shifting rotatively to an extent which would permit the fitting 33 to abut with either side of the opening 42 through the backing plate 7. Thus, a source of objectionable noise is eliminated and further advantages accrue as the result of the provision of an anchored actuator device in combination with other features hereinafter to be described.

In order to anchor the actuator 22 against rotative movements, the cylinder body 23 thereof is provided on its inner periphery with a pair of diametrically opposed supporting flanges 65 and 66, the supporting flange 65 being provided with a pair of circumferentially spaced arcuate bearing portions 67, 67 engageable with the arcuate bearing portions 16, 16 on the supporting lug 15 of the backing plate 7, and the supporting flange 66 being provided with a pair of circumferentially spaced arcuate bearing portions 68, 68 engageable with the arcuate bearing portions 16', 16' of the supporting lug 15' on the backing plate 7. The complemental bearing portions designated 67 and 68 therefore support the actuator body 23 in concentric relation to the brake assembly. In addition, the supporting flange 65 is provided with a pair of opposed anchor lugs 69, 69 engageable with the respective opposite sides of the supporting lug 15 on the backing plate 7, and the supporting flange 66 is likewise provided with a pair of opposed anchor lugs 70, 70 engageable with the respective opposite sides of the supporting lug 15' on the backing plate 7. Thus, the anchor lugs designated 69 and 70 will serve to anchor the annular actuator body 23 against rotative movement.

In order to minimize and virtually eliminate any tendency of the annular actuator parts to bind, with consequent erratic brake action, a dust shield or cover 71 is interposed between the actuator body 23 and the outboard disc 13, this dust shield 71 being annular in form and generally U-shaped in cross section, and being shiftably mounted upon the annular actuator body 23 for axial movements thereon. However, the dust shield 71 is anchored in relation to the actuator body 23 so as to prevent relative rotation between these parts. In order to anchor the dust shield 71, the annular actuator body 23 is preferably provided with one or more marginal projections on its inner periphery. Two such projections designated 72 are shown in the illustrative embodiment, these marginal projections 72 preferably being disposed in diametrically spaced relation and adjacent to the supporting flanges 65 and 66 previously referred to, as is best shown in Fig. 12. The inner peripheral wall of the U-shaped annular dust shield 71 is preferably provided with marginal sockets or depressions designated 73 complementally formed for engagement with the projections 72 on the actuator body 23, and in order to add strength and rigidity to the portions of the dust shield 71 in which the sockets or depressions 73 are formed, a reinforcing section or strip of material designated 74 is suitably secured by spot welding or the like to the inner periphery of the dust shield 71 at these points.

Accordingly, the annular actuator piston 25 is not subjected to rotative drag by the outboard disc 13, thus preserving the life of the actuator piston 25, as well as the life of the annular seal 28, which annular seal as shown in Fig. 8 is of the type commonly referred to as "quad-ring" seal. Furthermore, an annular washer element 75 is preferably interposed between the seal 28 and the piston 25, thereby eliminating the necessity of accurately machining the actuator piston 25, although it should be understood that these specific details are not essential to the present invention.

By virtue of the actuator device being anchored against rotative movement and the dust shield 71 being anchored against rotative movement relative to the actuator body 23, no frictional resistance to brake applications is produced by the actuator device itself, and the tendency of the actuator parts to bind is eliminated.

In addition to the foregoing, the annular insulator members 26 and 27 which are respectively interposed between the outboard disc 13 and the dust shield 71 and between the inboard disc 14 and the annular cylinder body 23, are preferably secured to the faces of the discs, as by bonding or the like, thus eliminating any tendency of these insulator rings to bind during rotative movements of the discs and localizing friction to the contacting surfaces of the insulator ring 26 and the contiguous face of the dust shield 71. This localized friction has a distinct advantage in the elimination of objectionable noises during brake application, in that just enough resistance to relative rotation of the discs 13 and 14 is produced so that the balls 20, as they ride up the oppositely inclined ramp seats 21, 21 produce no clicking noises.

A further modification of the brake structure previously described resides in the anti-rattle means for preventing play of the inner disc assembly on the supporting lugs 15 and 15'. As is best seen in Figs. 7 and 8, the modified form of the anti-rattle means includes a coiled compression spring 77 which is interposed between a laterally extended projection 78 on the outboard side of the backing or adapter plate 7 and a pressure foot 79 which is engaged with the inner peripheries of the discs 13 and 14. A pin 80 extends through an opening in the projection 78, the coiled spring 77 and the pressure foot 79, this pin being headed at its opposite ends to retain these parts in assembled relation.

Referring particularly to Figs. 12, 13 and 14, a modified form of cylinder body 23 is shown, this cylinder body 23 generally corresponding to that previously described in connection with the modified brake of Figs. 7 through 10, but having an axially extending neck 81 integrally formed thereon and providing means for connecting the hydraulic actuator to a source of fluid pressure and for accommodating a bleeder valve such as shown and described hereinabove. The neck 81 has a pair of diverging passages 82 and 83 which are in communication with the annular piston chamber 24. For accommodating the bleeder valve just referred to, the neck 81 is bored as at 84, so that the passage 82 will establish communication between the piston chamber 24 and the atmosphere through such a bleeder valve. Also, the neck 81 is bored as at 85 to receive a coupling of a fluid conduit, so that fluid will pass from the conduit into the piston chamber 24 via the passage 83. Preferably, the end surfaces of the neck 81 surrounding the openings defined by the bores 84 and 85 are suitably roughened or serrated as at 86 to enhance sealing engagement of a fluid conduit in the bores 84 and 85 which are both suitably screw-threaded to receive the bleeder valve and conduit coupling or connector.

In order that the adjuster screws previously referred to will not wear the complemental threads of the screw-supporting lugs 50 of the self-adjusters, the screws 49 are threadedly mounted in inserts 86, 86 which are preferably made of steel and cast into the supporting lugs 50 of the disc 13. Accordingly, the discs may advantageously be die-cast of aluminum or other light-weight material which would not inherently endure the strain and wear to which the screw-supporting lugs 50 are subjected. Furthermore, the lugs 51 which are engaged with the lead ends 53 of the screws 49 are preferably provided with an insert 87 of steel or other suitable material, such inserts preferably being embedded in the adjuster lugs 51 during casting of the disc 14 and being generally rectangular in form, but having terminal anchor projections 88 which are hooked so as to be interlocked with the material of the lugs 51.

While the illustrative brakes herein shown and described represent the left front-wheel brakes of a motor vehicle, it is to be understood that similar brake assemblies are equally suitable for use on the rear wheel of a motor vehicle and the only modification that would be required would be in the specific construction of the backing or adapter plate 7. Such modification is required only because of the need to mount the brake on a rear axle housing, in the case of a rear wheel brake, and on a front wheel spindle support, in the case of a front wheel brake.

Accordingly, the illustrative brakes are shown as including a pair of marginal projections on the inner periphery of the outboard disc 13, as at 59, 59, these projections each having an opening 60 therethrough, and the inboard disc 14 is provided with a pair of openings 61, 61 through the anchor lugs 18 on its inner periphery. These openings 60 and 61 are adapted to receive suitable means for pivotally mounting a suitable mechanical actuator for the brake which can be utilized as an emergency brake in the case of a rear wheel application. Such a mechanical actuator is disclosed in a co-pending United States application, Serial Number 328,909, filed December 31, 1952, and forms no part of the present invention.

While the illustrated brakes embody an inboard disc 14 which constitutes a friction disc engageable with the rotatable housing, it is to be understood that this inboard disc also constitutes a support for the friction disc 13, but, without departing from the spirit of the present invention, the inboard disc 14 or any other comparable element may be used solely for the purpose of supporting a single friction disc such as the disc 13 of the present invention, while the member 14 may have no function as a friction disc itself. In the following claims, unless the inboard disc 14 is specifically defined as being a friction disc or plate, it is to be understood that this element may or may not serve as a friction disc, but may have solely the function of a supporting plate for the outboard disc 13.

While the specific details of the present invention have been herein shown and described, changes and alterations may be resorted to without departing from the spirit thereof as defined in the appended claims.

We claim:

1. A disc brake of the class described, comprising a stationary member having supporting means extending outwardly therefrom, a rotary housing to be braked, said housing having inner friction surfaces disposed in axially spaced opposed relation, a relatively fixed disc disposed between said friction surfaces and mounted on said supporting means for axial movement, means anchoring said disc against rotation on said supporting means, a rotatable disc, means shiftably supporting said rotatable disc upon said relatively fixed disc comprising camming means disposed between said discs and resilient means connecting said discs together, actuator means for shifting said discs into engagement with the friction surfaces of said rotary housing to cause slight rotation of said rotatable disc with said housing in one direction, means for anchoring said rotatable disc against rotation in the opposite direction comprising self-adjuster means, the supporting means on said stationary member comprising a lug, said lug and said relatively fixed disc having complemental bearing surfaces for slidably supporting said relatively fixed disc on the lug, and the stationary member being provided with a support spaced from said lug, and a resilient member engaged with said support and bearing on said relatively fixed disc to maintain the bearing surface on the latter in contact with the bearing surface on the lug.

2. A disc brake of the class described, comprising a stationary member having supporting means extending outwardly therefrom, a rotary housing to be braked, said housing having inner friction surfaces disposed in axially spaced opposed relation, a relatively fixed disc disposed between said friction surfaces and mounted on said supporting means for axial movement, means anchoring said disc against rotation on said supporting means, a rotatable disc, means shiftably supporting said rotatable disc upon said relatively fixed disc comprising camming means disposed between said discs and resilient means connecting said discs together, actuator means for shifting said discs into engagement with the friction surfaces of said rotary housing to cause slight rotation of said rotatable disc with said housing in one direction, means for anchoring said rotatable disc against rotation in the opposite direction comprising self-adjuster means, one of said discs being provided with a circumferentially extended supporting flange extending therefrom towards the other disc, and the actuator means comprises an annular hydraulic actuator cylinder disposed between said discs and freely mounted upon said flange.

3. A disc brake of the class described, comprising a stationary member having supporting means extending outwardly therefrom, a rotary housing to be braked, said housing having inner friction surfaces disposed in axially spaced opposed relation, a relatively fixed disc disposed between said friction surfaces and mounted on said supporting means for axial movement, means anchoring said disc against rotation on said supporting means, a rotatable disc, means shiftably supporting said rotatable disc upon said relatively fixed disc comprising camming means disposed between said discs and resilient means connecting said discs together, actuator means for shifting said discs into engagement with the friction surfaces of said rotary housing to cause slight rotation of said rotatable disc with said housing in one direction, means for anchoring said rotatable disc against rotation in the opposite direction comprising self-adjuster means, said discs being each provided with a circumferentially extended supporting flange extending towards the other disc and forming a channel between the discs, and the actuator means includes an annular hydraulic actuator cylinder disposed in said channel and supported on the flanges.

4. In a disc brake of the class described, comprising a rotatable housing having internal, axially spaced and radially extended opposed friction surfaces, a stationary support, and an inner disc assembly including a pair of discs operatively mounted on said support within said housing and disposed between said friction surfaces, with one disc free for slight rotative movements relative to the other disc, self-energizing means for spreading the discs axially apart responsive to such rotative movement of said one disc, operating means for said discs, that improvement wherein the operating means includes an annular fluid pressure operated actuator device disposed between said discs and operative to spread said discs into engagement with the friction surfaces of the housing, cooperative means on said annular actuator device and on said support for anchoring the actuator device against rotative movement, said actuator device including an annular fluid cylinder body having an annular piston chamber therein, an annular piston in said piston chamber, said body and piston respectively being operatively engageable with said discs, and a shield interposed between said piston and one disc, said shield and said body having means interlocking them against relative rotation.

5. In a disc brake of the class described, comprising a rotatable housing having internal, axially spaced and radially extended opposed friction surfaces, a stationary support, and an inner disc assembly including a pair of discs operatively mounted on said support within said housing and disposed between said friction surfaces, with one disc free for slight rotative movements relative to the other disc, self-energizing means for spreading the discs axially apart responsive to such rotative movement of said one disc, operating means for said discs, that improvement wherein the operating means includes an annular fluid pressure operated actuator device disposed between said discs and operative to spread said discs into engagement with the friction surfaces of the housing, cooperative means on said annular actuator device and on said support for anchoring the actuator device against rotative movement, said actuator device including an annular fluid cylinder body having an annular piston chamber therein, an annular piston in said piston chamber, said body and piston respectively being operatively engageable with said discs, and a shield interposed between said piston and one disc, said shield and said body having means for interlocking them against relative rotation, and an insulator member secured to each of said discs and respectively interposed between said shield and said one disc and between said cylinder body and the other disc.

6. In a disc brake of the class described, comprising a rotatable housing having internal, axially spaced and radially extended opposed friction surfaces, a stationary support, and an inner disc assembly including a pair of discs operatively mounted on said support within said housing and disposed between said friction surfaces, with one disc free for slight rotative movements relative to the other disc, self-energizing means for spreading the discs axially apart responsive to such rotative movement of said one disc, operating means for said discs, that improvement wherein the operating means includes an annular fluid pressure operated actuator device disposed between said discs and operative to spread said discs into engagement with the friction surfaces of the housing, cooperative means on said annular actuator device and on said support for anchoring the actuator device against rotative movement, said support being provided with diametrically spaced bearing surfaces, and said discs having the form of rings, said discs being provided with marginal bearing surfaces on their inner peripheries engageable with the bearing surfaces on said support, and including an anti-rattle spring engaged with said disc assembly adjacent to the bearing surfaces at one side of the support and biasing said disc assembly into firm engagement with the diametrically spaced bearing surfaces.

7. In a disc brake of the class described, comprising a rotatable housing having internal, axially spaced and radially extended opposed friction surfaces, a stationary support, and an inner disc assembly including a pair of discs operatively mounted on said support within said housing and disposed between said friction surfaces, with one disc free for slight rotative movements relative to the other disc, self-energizing means for spreading the discs axially apart responsive to such rotative movement of said one disc, operating means for said discs, that improvement wherein the operating means includes an annular fluid pressure operated actuator device disposed between said discs and operative to spread said discs into engagement with the friction surfaces of the housing, cooperative means on said annular actuator device and on said support for anchoring the actuator device against rotative movement, said support being provided with diametrically spaced bearing surfaces, and said discs having the form of rings, said discs being provided with marginal bearing surfaces on their inner peripheries engageable with bearing surfaces on said support, said support having a spring seat overlying the inner peripheries of said discs, a pin carried at one end by said seat and having a pressure foot at its other end, and a spring interposed between said spring seat and said pressure foot for biasing said pressure foot into engagement with the inner peripheries of said discs adjacent to the bearing surfaces at one side of said support for biasing the discs into firm engagement with the diametrically spaced bearing surfaces.

8. A disc brake of the class described, comprising a plurality of disc-like members disposed in side-by-side relation, one of said members being shiftable axially to effect engagement of the brake, operating means for shifting the latter members including an annular fluid pressure-operated actuator device floating between a pair of said members for axial movements and having anchor means for anchoring the actuator device against rotative movements, said annular actuator device including an annular cylinder body having an annular piston chamber therein, a piston reciprocably disposed in said piston chamber and projecting towards one of said disc-like members, a shield disposed between said piston and the latter disc-like member and projecting into overlying relation to said cylinder body, and said cylinder body and said shield having cooperatively engaged parts interlocking the shield and the body against relative rotation.

9. A disc brake of the class described, comprising a plurality of disc-like members disposed in side-by-side relation, one of said members being shiftable axially to effect engagement of the brake, operating means for shifting the latter members including an annular fluid pressure-operated actuator device floating between a pair of said members for axial movements and having anchor means for anchoring the actuator device against rotative movements, said annular actuator device including an annular cylinder body having an annular piston chamber therein, a piston reciprocably disposed in said piston chamber and projecting towards one of said disc-like members, a shield disposed between said piston and the latter disc-like member and projecting into overlying relation to said cylinder body, said cylinder body and said shield having cooperatively engaged parts interlocking the shield and the body against relative rotation, and an insulator member interposed between said shield and the adjacent disc-like member and fixedly secured on one of the latter members.

References Cited in the file of this patent

UNITED STATES PATENTS

| | | |
|---|---|---|
| 2,020,667 | Wahl | Nov. 12, 1935 |
| 2,142,174 | Burrow | Jan. 3, 1939 |
| 2,320,286 | Lambert | May 25, 1943 |
| 2,375,854 | Lambert | May 15, 1945 |
| 2,375,855 | Lambert | May 15, 1945 |
| 2,551,251 | Du Bois | May 1, 1951 |
| 2,563,759 | Tiscornia et al. | Aug. 7, 1951 |
| 2,614,662 | Hawley | Oct. 21, 1952 |
| 2,799,366 | Zindler | July 16, 1957 |

FOREIGN PATENTS

| | | |
|---|---|---|
| 1,011,243 | France | June 20, 1952 |
| 813,638 | Germany | Sept. 13, 1951 |
| 829,703 | Germany | Jan. 28, 1952 |
| 834,625 | Germany | Mar. 20, 1952 |

UNITED STATES PATENT OFFICE

CERTIFICATE OF CORRECTION

Patent No. 2,889,894                                    June 9, 1959

Millard B. Lucker et al.

It is hereby certified that error appears in the printed specification of the above numbered patent requiring correction and that the said Letters Patent should read as corrected below.

Column 8, line 20, for '"quad-ring"' read -- lobed --.

Signed and sealed this 23rd day of August 1960.

(SEAL)
Attest:
KARL H. AXLINE
Attesting Officer

ROBERT C. WATSON
Commissioner of Patents